US012737196B2

(12) United States Patent
Wang et al.

(10) Patent No.: US 12,737,196 B2
(45) Date of Patent: Sep. 15, 2026

(54) SHARED LIBRARY LOADING USING PREDEFINED LOADING POLICY

(71) Applicant: INTERNATIONAL BUSINESS MACHINES CORPORATION, Armonk, NY (US)

(72) Inventors: Heng Wang, Changping District (CN); Xiao Ling Chen, Changping District (CN); Xin Peng Liu, Austin, TX (US); Tao Guan, Toronto (CA); Wei Wu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 212 days.

(21) Appl. No.: 17/956,728

(22) Filed: Sep. 29, 2022

(65) Prior Publication Data

US 2024/0111550 A1 Apr. 4, 2024

(51) Int. Cl.
*G06F 9/445* (2018.01)

(52) U.S. Cl.
CPC ................................ *G06F 9/44521* (2013.01)

(58) Field of Classification Search
None
See application file for complete search history.

(56) References Cited

U.S. PATENT DOCUMENTS 10,409,507 B1 9/2019 Huang et al.
10,445,112 B2 10/2019 Sirajuddin
2007/0288944 A1* 12/2007 Kato .................. G06F 9/44521 719/331
2008/0098368 A1* 4/2008 Biswas .............. G06F 9/45516 717/136
2008/0270461 A1 10/2008 Gordon et al.
(Continued)

FOREIGN PATENT DOCUMENTS

CN 102073520 A 5/2011
CN 108762825 A 11/2018
(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Umut Onat
(74) *Attorney, Agent, or Firm* — CHIP LAW GROUP

(57) ABSTRACT

A computer-implemented process is disclosed. An application is loaded into a local address space. A request by the application to load a target shared library is intercepted by an interceptor. Using the interceptor and based upon the request being intercepted, a shared library correlation table is searched for a loading count and a loading policy associated with the target shared library. Based upon the loading count and the loading policy, a selection is made between loading the target shared library as a shared library container, and loading the target shared library into the local address space. The target shared library is loaded based upon the selecting. The loading count represents a number of times the target shared library was loaded, and the loading policy indicates how the target shared library is to be loaded.

18 Claims, 6 Drawing Sheets

(56) References Cited

U.S. PATENT DOCUMENTS

| | | | | |
|---|---|---|---|---|
| 2014/0007125 | A1* | 1/2014 | Chung | G06F 9/5005 718/104 |
| 2014/0304719 | A1 | 10/2014 | Pope et al. | |
| 2015/0332043 | A1* | 11/2015 | Russello | G06F 11/3466 726/22 |
| 2016/0364222 | A1 | 12/2016 | Schultz et al. | |
| 2017/0132345 | A1 | 5/2017 | Dumont et al. | |
| 2018/0203995 | A1 | 7/2018 | Yuen et al. | |
| 2019/0243636 | A1 | 8/2019 | Sahu et al. | |
| 2019/0294798 | A1 | 9/2019 | Jin et al. | |
| 2021/0373979 | A1 | 12/2021 | Lewin et al. | |
| 2023/0035594 | A1 | 2/2023 | Iyer et al. | |
| 2023/0092747 | A1 | 3/2023 | Wang et al. | |
| 2023/0393980 | A1* | 12/2023 | Abdoulaye | G06F 16/9014 |
| 2024/0202036 | A1 | 6/2024 | Wang et al. | |
| 2024/0256312 | A1* | 8/2024 | Lin | G06F 9/454 |

FOREIGN PATENT DOCUMENTS

| | | | |
|---|---|---|---|
| CN | 109753319 | B | 5/2019 |
| CN | 109791483 | A | 5/2019 |
| CN | 107102888 | B | 11/2019 |
| CN | 115904528 | A | 4/2023 |
| JP | 2008-017034 | A | 1/2008 |
| JP | 2010-244516 | A | 10/2010 |
| JP | 2013-105349 | A | 5/2013 |
| JP | 2020113050 | A | 7/2020 |
| JP | 2023046312 | A | 4/2023 |
| KR | 2012-0014673 | A | 2/2012 |

OTHER PUBLICATIONS

Wu, Y. et al., "Codejail: Application-transparent isolation of libraries with tight program interactions," In European Symposium on Research in Computer Security, Sep. 10, 2012, pp. 859-876, Springer, Berlin, Heidelberg.

MattN, "runtime: support dlclose with—buildmode=c-shared #11100," [online] GitHub, Jun. 6, 2015, retrieved from the Internet: <https://github.com/golang/go/issues/11100>, 22 pg.

Sreecha, "Clearly document the cases where fork() is supported in grpc() #14055," [online] "Clearly document the cases where fork() is supported in grpc() #14055," GitHub, Jan. 17, 2018, retrieved from the Internet: <https://github.com/grpc/grpc/issues/14055>, 4 pg.

Japan Patent Office, "Notice of Reasons for Refusal" Nov. 11, 2025, 05 Pages, JP Application No. 2022-150019.

IBM: List of IBM Patents or Patent Applications Treated as Related, Jun. 8, 2023, 2 pg.

Wang H. et al., "Using Containers to Clean Runtime Resouces When Unloading a Shared Library", U.S. Appl. No. 17/481,580, filed Sep. 22, 2021, 39 pages. (A copy is not provided as this application is available to the Examiner.

The State Intellectual Property Office of People's Republic of China, "First Office Action", Jan. 30, 2026, 16 Pages, CN Application No. 202211156019.6.

* cited by examiner

Containerized Shared Library Correlation Table

| | Index | Running Status | Containerized Value | Reference Count | Dependence Indexes | Loading Count | Loading Policy | Container ID / Local Handle |
|---|---|---|---|---|---|---|---|---|
| 220A | [1] | LOADED | libtarget_go.so | 1 | [3] \| [4] \| - | 1 | C | fe8a714a* |
| 220B | [2] | LOADED | libssl.so | 2 | [4] - | 1 | L | 0x80002aa0 |
| 220C | [3] | LOADED | libgrpc.so | 2 | - | 1 | C | 323be7a* |
| 220D | [4] | LOADED | libc.so.1 | 2 | - | 2 | L | 0x8000aff0 |
| | 202 | 204 | 206 | 208 | 210 | 212 | 214 | 216 |

SHARED LIBRARY LOADING USING PREDEFINED LOADING POLICY

BACKGROUND

The present invention relates to managing the loading/unloading of shared dynamic libraries, and more specifically, to loading a shared dynamic library based upon a predefined loading policy.

An application program (sometimes referred to herein as "application" or "computer program") can utilize one or more computer libraries (hereinafter referred to as "library" or "libraries") to improve efficiency in both the development and execution of the application program. A library is a collection of non-volatile resources used by computer programs. Libraries can include, for example, configuration data, documentation, help data, message templates, pre-written code, and pre-written subroutines. When an application invokes a library, it gains the behavior (e.g., data and/or function) implemented inside that library without having to implement that behavior itself. Thus, instead of the application implementing the behavior itself, the application can make a system call to the library. Additionally, a single library can be made available to (i.e., shared amongst) multiple different applications, which allows multiple applications to gain the efficiency provided by the library. Consequently, a library is oftentimes referred to as a shared library.

Libraries are generally referred to as static or dynamic. A dynamic library is separate from the executable file (i.e., application) that calls the dynamic library and is loaded at runtime. A dynamic linker/loader (hereinafter referred to as just "dynamic linker") is specific collection of functions (e.g., as part of an operating system) that is used to load, unload, and link shared libraries, as required by an executable (e.g., an application) during runtime. These functions can include, for example, copying of the contents of the library to local memory, filling jump tables, and relocating pointers.

A problem can occur in many operating systems with the unloading of a shared dynamic library. The term "unloading" refers to the process of removing a computer file (e.g., an application, an object, a library and the like) from computer memory. This is typically performed to free up memory space, and is performed after there is no longer a need for the file. One particular manner in which a dynamic shared library is unloaded is by using a function call to the dynamic linker, for example, using dlclose ( ) Depending upon the operating system being used with the shared library, the closing of a dynamic shared library may result in a segmentation error, which is a type of error associated when a function/method/application attempts to improperly access a particular memory location, such as a protected memory location.

As an example, gRPC (Google® remote procedure call) is a modern open source high performance RPC framework. However, several RPC frameworks (e.g., gRPC) do not support "cross-process invoke," and if a gRPC library is loaded it cannot be unloaded. Consequently, in such a RPC framework, a segmentation fault may occur if there is an attempt to unloaded the shared object (e.g., the gRPC library). As another example, Golang (also referred to as Go) is an open source programming language in which a segmentation fault can occur when unloading a shared library using dlclose ( ).

Consequently, there is a need for a system and methodology that allows shared libraries to be loaded in a manner that does not cause segmentation faults.

SUMMARY

A computer-implemented process for training a prediction model for survival analysis includes the following operations. An application is loaded into a local address space. A request by the application to load a target shared library is intercepted by an interceptor. Using the interceptor and based upon the request being intercepted, a shared library correlation table is searched for a loading count and a loading policy associated with the target shared library. Based upon the loading count and the loading policy, a selection is made between loading the target shared library as a shared library container, and loading the target shared library into the local address space. The target shared library is loaded based upon the selecting. The loading count represents a number of times the target shared library was loaded, and the loading policy indicates how the target shared library is to be loaded. Through the use of the loading policy, segmentation faults can be avoided in circumstances (e.g., in a particular shared library/operating system combinations) by loading the target shared library as a container instead of to local address space.

In other aspects of the process, the shared library correlation table includes, for each of a plurality of target shared libraries: the loading count, the loading policy, and one of a local handle and a container ID. The local handle is associated with a pointer to the target shared library loaded in the local memory space, and the container ID is an identification of the shared library container of the target shared library. Based upon the locating count being greater than an initial value and the load policy indicates to load the target shared library as a container a container platform is invoked to load the shared library container. Based upon the loading count being an initial value, a dynamic linker is invoked to load the target shared library, the loading count is incremented to generate an incremented loading count, and the incremented loading count is stored within the shared library correlation table. Also, upon the interceptor intercepting a request to unload the target shared library, one of the local handle and the container ID for the target shared library is retrieved by the interceptor from the shared library correlation table. The interceptor can be configured, based the local handle being retrieved, to forward the local handler to a dynamic linker to unload the target shared library from the local address space. The interceptor module can also be configured, based upon the container ID being retrieved, to forward the container ID to a container handler to unload the target shared library. The request is generated using a dlopen call and the loading is performed using a mocked dlopen function, and the mocked dlopen function includes the searching the shared library correlation table.

A computer hardware system for training a prediction model for survival analysis includes a hardware processor configured to perform the following executable operations. An application is loaded into a local address space. A request by the application to load a target shared library is intercepted by an interceptor. Using the interceptor and based upon the request being intercepted, a shared library correlation table is searched for a loading count and a loading policy associated with the target shared library. Based upon the loading count and the loading policy, a selection is made between loading the target shared library as a shared library container, and loading the target shared library into the local address space. The target shared library is loaded based upon the selecting. The loading count represents a number of times the target shared library was loaded, and the loading policy indicates how the target shared library is to be loaded.

In other aspects of the hardware system, the shared library correlation table includes, for each of a plurality of target shared libraries: the loading count, the loading policy, and one of a local handle and a container ID. The local handle is associated with a pointer to the target shared library loaded in the local memory space, and the container ID is an identification of the shared library container of the target shared library. Based upon the locating count being greater than an initial value and the load policy indicates to load the target shared library as a container a container platform is invoked to load the shared library container. Based upon the loading count being an initial value, a dynamic linker is invoked to load the target shared library, the loading count is incremented to generate an incremented loading count, and the incremented loading count is stored within the shared library correlation table. Also, upon the interceptor intercepting a request to unload the target shared library, one of the local handle and the container ID for the target shared library is retrieved by the interceptor from the shared library correlation table. The interceptor can be configured, based the local handle being retrieved, to forward the local handler to a dynamic linker to unload the target shared library from the local address space. The interceptor module can also be configured, based upon the container ID being retrieved, to forward the container ID to a container handler to unload the target shared library. The request is generated using a dlopen call and the loading is performed using a mocked dlopen function, and the mocked dlopen function includes the searching the shared library correlation table.

A computer program product includes a computer readable storage medium having stored therein program code for training a prediction model for survival analysis. The program code, which when executed by a computer hardware system, cause the computer hardware system to perform the following. An application is loaded into a local address space. A request by the application to load a target shared library is intercepted by an interceptor. Using the interceptor and based upon the request being intercepted, a shared library correlation table is searched for a loading count and a loading policy associated with the target shared library. Based upon the loading count and the loading policy, a selection is made between loading the target shared library as a shared library container, and loading the target shared library into the local address space. The target shared library is loaded based upon the selecting. The loading count represents a number of times the target shared library was loaded, and the loading policy indicates how the target shared library is to be loaded.

In other aspects of the computer program product, the shared library correlation table includes, for each of a plurality of target shared libraries: the loading count, the loading policy, and one of a local handle and a container ID. The local handle is associated with a pointer to the target shared library loaded in the local memory space, and the container ID is an identification of the shared library container of the target shared library. Based upon the locating count being greater than an initial value and the load policy indicates to load the target shared library as a container a container platform is invoked to load the shared library container. Based upon the loading count being an initial value, a dynamic linker is invoked to load the target shared library, the loading count is incremented to generate an incremented loading count, and the incremented loading count is stored within the shared library correlation table. Also, upon the interceptor intercepting a request to unload the target shared library, one of the local handle and the container ID for the target shared library is retrieved by the interceptor from the shared library correlation table. The interceptor can be configured, based the local handle being retrieved, to forward the local handler to a dynamic linker to unload the target shared library from the local address space. The interceptor module can also be configured, based upon the container ID being retrieved, to forward the container ID to a container handler to unload the target shared library. The request is generated using a dlopen call and the loading is performed using a mocked dlopen function, and the mocked dlopen function includes the searching the shared library correlation table.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
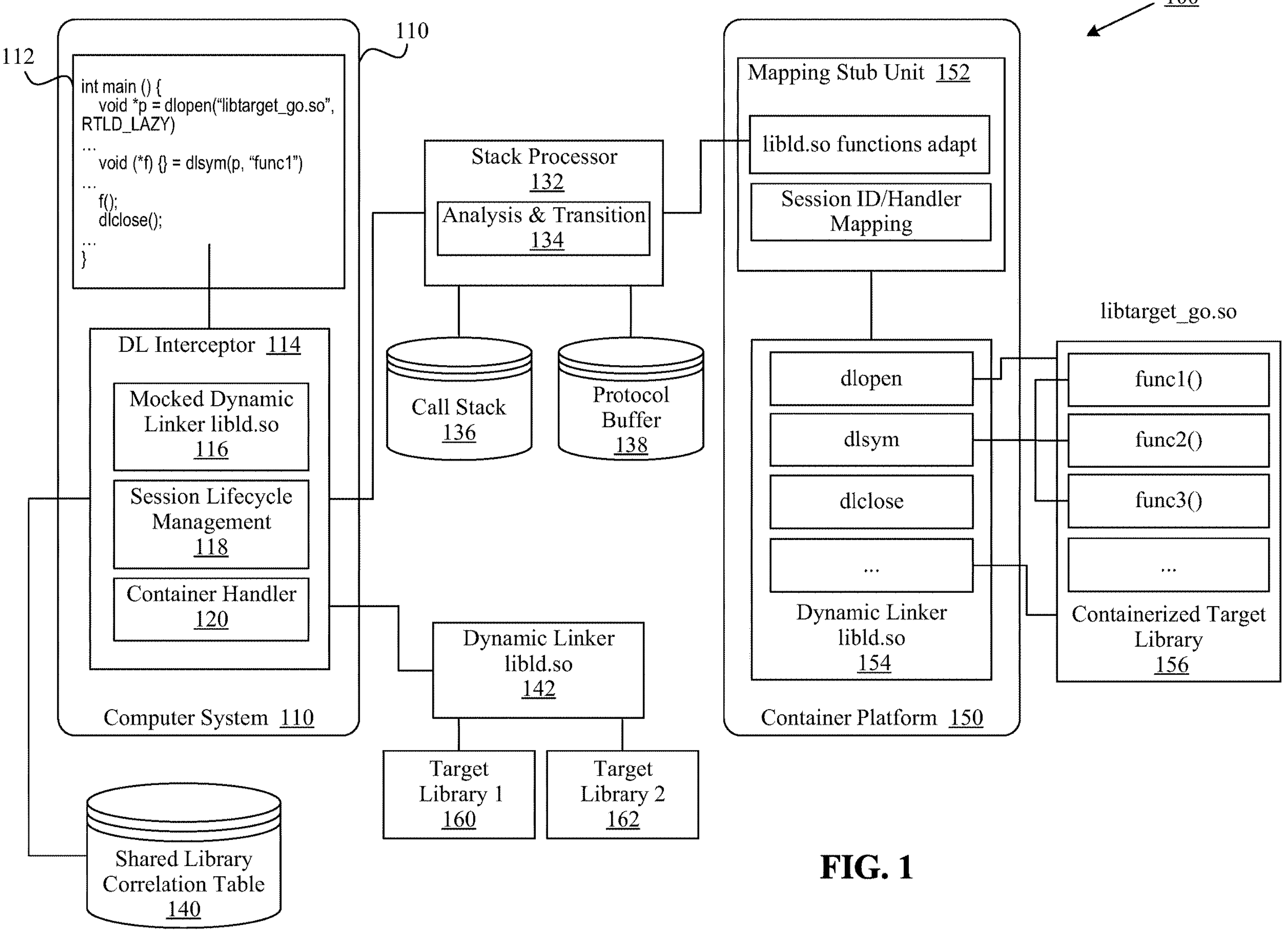
FIG. 1 is an architectural drawing of a system for loading/unloaded shared dynamic libraries according to an embodiment of the present invention.

FIG. 1 is an architectural drawing of a system 100 in accordance with certain aspects of the invention. System 100 can include, for example, a computer system 110, a stack processor 132, and a containerization platform 150. The system 100 can also include a shared library correlation table 140, which is discussed in more detail with regard to FIG. 2. As will be discussed in more greater detail below, the system 100 can load a target shared library 160, 162 into local address space if the loading of the target shared library 160, 162 will not result in a cleanup issue (e.g., as part of a dlclose ( ) function). Additionally, the system 100 can cause all dependent shared libraries (of an original shared library) to be unloaded when unloading of the original shared library).

Loaded within the computer system 110 is a set of software instructions (e.g., computer code) 112 and a dynamic link (DL) interceptor 114. The set of computer code 112 can be in the form of a program/application. In certain aspects, the computer code 112 include a dlopen( ) function and a dlclose ( ) function. As known to those skilled in the art, a dlopen( ) function and a dlclose ( ) function are used, respectively, to load and unload a dynamic shared object (e.g., a shared library 156, 160, 162). By way of example, the program "libtarget_go.so" is a name of a shared library. Additionally, the computer code 112 can include dlsym ( ), which allows a process to obtain the address of a symbol defined within an object made accessible through a dlopen ( ) call. These three functions can be provided by libld.so (i.e., an example of a dynamic linker/loader 142).

Dynamic Link Interceptor

The DL interceptor 114 is configured to intercept, from the computer code 112, function calls pertaining to a shared library 156, 160, 172. The DL interceptor 114 includes a mocked dynamic linker 116 (e.g., libld.so). As known to those skilled in the art, mocking involves replacing a method/object that simulates the behavior of the real method/object while performing something additional. In this instance, the mocked dynamic linker 116 is simulating, to the computer code 112, the functions (e.g., dlopen( ), dlsym ( ), and dlclose ( )) of the actual dynamic linker 142. In so doing, the mocked libld.so 116 receives requests from the computer code 112, and the request will be handled and delivered to the real "libld.so" 142. Certain operations of the DL interceptor 114 are discussed in more detail with regard to methodologies 300, 400 respectively illustrated in FIGS. 3 and 4.

The DL interceptor 114 can also include a session lifecycle management unit 118 and a container handler 120. The session lifecycle management unit 118 is configured to create a session structure for which one program/application (i.e., computer code 112) corresponds to a session structure containing a unique "session ID," which is a "targeted shared library name." When the customized container starts up, the "targeted shared library name" will be loaded by the dynamic linker/loader (libld.so) inside the container.

The container handler 120 is configured to provide functions to the stack processor 132 to manage containers. For example, the container handler 120 can provide Init ( ) and Destroy ( ) functions. Init (Session ID, DL Name) creates a container and passes the DL Name (the shared library name) to the container so that the dynamic linker/loader (libld.so) knows which shared library needs to be loaded inside the container. Destroy ( ) destroys the created container.

Stack Processor

The stack processor 132 can include an analysis and transition unit 134 and be communicatively coupled to a call stack 136 and a protocol buffer 138. In general, a call stack 136 is a specific type of data structure that stores information about the active subroutines of a computer program. The analysis and transition unit 134 is configured to support the functions of Pack ( ) and Unpack ( ) which are used to convert parameters contained in the call stack 136 to parameters in the protocol buffer 138 and vice versa. The Pack ( ) function converts parameters from the call stack 136 of the running computer code to a form that can be stored in the protocol buffer 138. The Unpack ( ) method converts parameters from the form used in the protocol buffer 138 and then writes the converted parameters to the call stack 136. A protocol buffer 138 is used as the parameters in the protocol buffer 138 are easier to transfer than the parameters stored within the call stack 136.

Container Platform

The container platform 150 is a specific type of computer architecture configured to manage containerized objects (e.g., libraries and applications) including functions related to automation, orchestration, governance, security, and customization. As is known to those skilled in the art, a container is an executable unit of software in which application code is packaged, along with its libraries and dependencies, in common ways so that the application can be run anywhere (e.g., desktop, traditional IT, or the cloud container). This package includes all of the necessary components (application code, runtime systems tools, systems libraries, software dependencies, etc.) need to run the particular application. Unlike a virtual machine that virtualizes the underlying hardware, a container virtualizes the operating system (along with the application, its libraries and dependencies).

Many types of container platforms 150 exist, and the present disclosure is not limited as to a particular type. Examples of container platforms include Docker and Kubernetes. The following is a description of how a typical container platform 150 operations. However, the system 100 is not limited as to this precise functionality.

As illustrated, the container platform 150 includes a mapping stub unit 152, dynamic linker (i.e., libdl.so), and other shared libraries such as libtarget_go.so. The mapping stub unit 152 loads the real libld.so to the memory address space of container platform 150, and the libld.so loads the libtarget_go.so to the memory address space of container platform 150. A mapping between the session ID and the handler is recorded. The data and dlsym ( ) request are routed to the target shared library when a dl function is invoked. The libld.so functions adapt portion of the mapping stub unit 152 receives protocol buffer data from the stack processor 132. The mapping stub unit 152 also keeps the map of a session ID and handler so that when a dlsym ( ) request is received, the mapping stub unit 152 knows the target place to which the request is to be routed.

Shared Library Correlation Table

Figure 2:
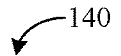
FIG. 2 is a graphical illustration of the shared library correlation table of FIG. 1.

FIG. 2 is a graphical representation of the shared library correlation table 140 according to certain aspects of the present disclosure. The shared library correlation table 140 is a table representing the different possible libraries that can be invoked by the computer code 112 as well as the respective statuses of these libraries. Each entry 200A-D, in the shared library correlation table 140 can be added as a particular shared library is loaded. In addition to or alternatively, the shared library correlation table 140 can be populated based upon knowing all of the libraries that could be opened by the computer code 112. For example, when a loader loads the computer code, the loader can read a file (e.g., the dependent shared library) in the computer code 112 and determine what libraries will need to be loaded. If, for example, the computer code 112 is compiled in an executable binary (e.g., the ELF format in Linux), there is a filed named "dynamic sections" that contains all the library libraries that the binary depends upon.

For each target shared library in an entry 220A-D, the library correlation table 140 can include the following data:

Index 202. The index 202 is a value specific to the shared library correlation table 140 that allows for each entry 220A-D in the shared library correlation table 140 to be identified.

Running Status 204. The running status 204 can indicate with the target shared library is loaded or loaded. Although not illustrated, the running status can also indicate whether the target shared library is loaded inside a container or in a local address space. An address space is a range of valid addresses in memory that are available for a program or process, and being loaded in the local address space refers to the target shared library being loaded into the same address space as the computer code 112.

Containerized Value 206. The containerized value 206 is the name of the target shared library as it would be invoked (e.g., by computer code 112).

Reference Count 208. The reference count 208 indicates how many times the target shared library was referenced—either by an executable (i.e., the computer code 112) or by another shared library.

Dependence Index 210. The dependence index indicates what other shared libraries are referenced by the target shared library. For example, libtarget_go.so references both libgrpc.so and libc.so.1. Additionally, lbssl.so references libc.so.1.

Loading Count 212. The loading count 212 indicates how many times the target shared library was loaded. If the target shared library has not been previously loaded, the loading count 212 will be set to an initial value, for example, zero (or null). This loading count 212 will be incremented each time the target shared library is invoked and loaded.

Loading Policy 214. The loading policy 214 indicates how the target shared library is loaded. In particular, the loading policy 214 indicates whether the target shared library is to be loaded to the local address space or loaded as a shared library container. The loading policy 214 for a particular shared library is predetermined and can be loaded, for example, from a Config file. Through the use of the loading policy 214, segmentation faults can be avoided in circumstances (e.g., in a particular shared library/operating system combinations) by loading the target shared library as a shared library container instead of to local address space. By way of example, if the library is a compiled using Golang, it may be predetermined that this library may experience a segmentation fault in a multi-thread environment. Accordingly, this shared library may have a loading policy 214 indicating that it be loaded as a shared library container instead of to local address space.

Container ID/Local Handle 216. Depending upon whether the target shared library is loaded in the local address space (local handle) or as a shared library container (Container ID), and identification associated with the target shared library is stored. The length of the data in the Container ID/local handle 216 can be used to determine whether it refers to a Container ID or a local handle. For example, an address (i.e., of the local address space) will typically have a 32 bit length (for a 32 bit system) or a 64 bit length (for a 64 bit system). In contrast, a Container ID can be a UUID, which is usually a 128 bit length (or longer). However, a Container ID is not limited to a UUID and can be any unique ID and having a bit length that is different than the bit length of the local address.

Figure 3:
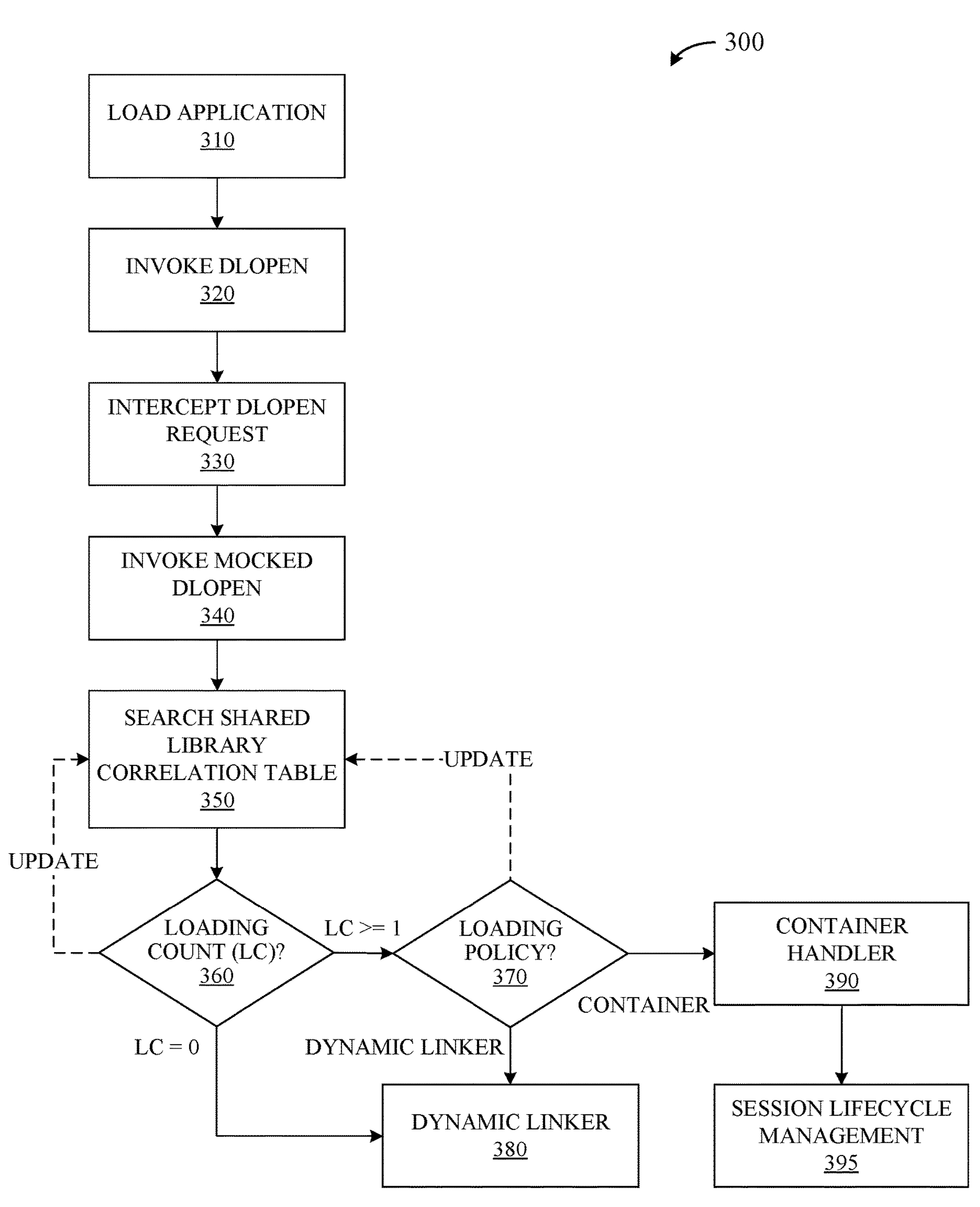
FIG. 3 is a flowchart of an example method for implementing the system of FIG. 1 upon a library load function being invoked according to an embodiment of the present invention.
Figure 4:
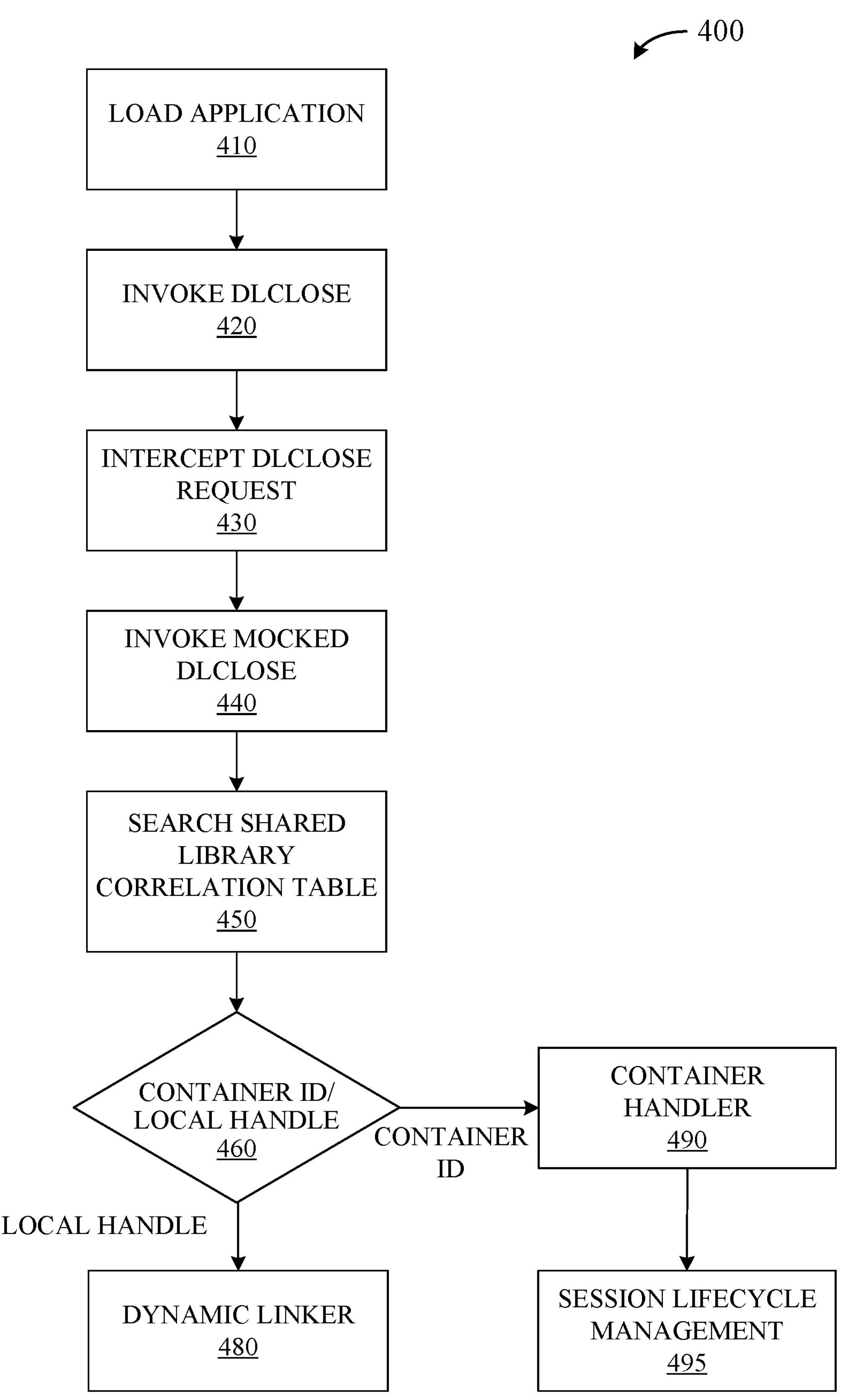
FIG. 4 is a flowchart of an example method for implementing the system of FIG. 1 upon a library unload function being invoked according to an embodiment of the present invention.

Operations of the system 100 are discussed in more detail with respect to the methodologies 300, 400 respectively illustrated in FIGS. 3 and 4. FIG. 3 illustrates an exemplary methodology 300 employing the system 100 when loading a target shared library 156, 160, 162. In 310, the application (computer code) 112 is loaded into address space using any known technique. In 320, the application 112 either at loading or during run time will invoke the loading of a target shared library 156, 160, 162. Although not limited to this particular function, the loading of the target shared library 156, 160, 162 can be performed using a dlopen ( ) function, as is well known to those skilled in the art. For ease of reference, the loading of the target shared library function will be hereinafter referred to as the dlopen ( ) function. Solely for the purposes of discussing FIGS. 3 and 4, target shared library 156 has been previously loaded and is associated with a containerization loading policy, target shared library 160 has been previously loaded and is associated with a local store policy, and target shared library 162 has not been previously loaded.

In 330, a call/request by the dlopen ( ) function to load a target shared library 156, 160, 162 is intercepted by the DL interceptor 114. Many types of techniques are known for the interception of function calls, and the DL interceptor 114 is not limited as to a particular technique. After the dlopen ( ) call has been intercepted, the mocked dynamic linker 116 is invoked in 340. In 350, the mocked dynamic linker 116 performs a search of the shared library correlation table 140 for an entry 220A-D corresponding to the particular target shared library 156, 160, 162 referenced by the dlopen ( ) function.

In 360, a loading count (LC) 212 (retrieved in 340) corresponding to the particular target shared library 156, 160, 162 being invoked by the dlopen ( ) function is evaluated. If the loading count 212 is at an initial value (e.g., zero or null), which indicates the target shared library 162 has not been previously loaded, then the process 300 forks to operation 380. However, if the loading count 212 is greater than an initial value (e.g., the target shared library 156, 160 has been previously loaded), then the process 300 forks to operation 370. The mocked dynamic linker 116 then causes the loading count 212 in the shared library correlation table 140 to be updated (as indicated by the dotted line).

In 370, the loading policy 214 (retrieved in 340) corresponding to the particular target shared library 156, 160 being referenced by the dlopen ( ) function is evaluated. If the loading policy 214 indicates that the target shared library 160 is to be loaded to the local address space, then the process 300 forks to operation 380. However, if the loading policy 214 indicates that the target shared library 156 is to be loaded as a shared library container, then the process 300 forks to operation 390. The mocked dynamic linker 116 then causes the container ID/local handle 216 of shared library correlation table 140 to be updated (as indicated by the dotted line). Through the use of the loading policy 214, segmentation faults can be avoided in circumstances (e.g., in a particular shared library/operating system combinations) by loading the target shared library as a shared library container instead of to local address space.

In 380, upon a determination (either in 360 or 370) that the target shared library 160, 162 is to be loaded to the local address space, the mocked dynamic linker 116 of the DL interceptor 114 invokes the actual dynamic linker 142, which proceeds to load the target shared library 160, 162 into local address space. In 390, upon a determination (in 370) that the target shared library 156 is to be loaded as a shared library container, the container handler 120 of the DL interceptor interacts with container platform 150 via the stack processor 132 to load the target shared library 156 as a shared library container. After the target shared library 156 has been loaded as a shared library container, the process 300 proceeds to 395, in which session lifecycle management is performed by the session lifecycle management unit 118.

FIG. 4 illustrates an exemplary methodology 400 employing the system 100 when unloading (e.g., closing) a target shared library 156, 160, 162. In 410, the application (computer code) 112 is loaded into address space using any known technique. In 420, the application 112 will invoke the unloading of a target shared library 156, 160, 162. Although not limited to this particular function, the unloading of the target shared library 156, 160, 162 can be performed using a dlclose ( ) function, as is well known to those skilled in the art. For ease of reference, the unloading of the target shared library function will be hereinafter referred to as the dlclose ( ) function.

In 430, a call/request by the dlclose ( ) function to unload a target shared library 156, 160, 162 is intercepted by the DL interceptor 114. Many types of techniques are known for the interception of function calls, and the DL interceptor 114 is not limited as to a particular technique. After the dlclose ( ) call has been intercepted, the mocked dynamic linker 116 is invoked in 440. In 450, the mocked dynamic linker 116 performs a search of the shared library correlation table 140 for an entry 220A-D corresponding to the particular target shared library 156, 160, 162 referenced by the dlclose ( ) function.

In 460, the container ID/local handle 216 (retrieved in 450) corresponding to the particular target shared library 156, 160, 162 being referenced by the dlclose ( ) function is evaluated. If the container ID/local handle 216 is a local handle, which indicates the target shared library 160, 162 was loaded into local address space, then the process 400 forks to operation 480. However, if the container ID/local handle 216 is a container ID, which indicates that the target shared library 156 was loaded as a shared library container, then the process 400 forks to operation 490.

In 480, upon a determination that the target shared library 160, 162 is to be unloaded from local address space, the mocked dynamic linker 116 of the DL interceptor 114 invokes the actual dynamic linker 142, which proceeds to unload the target shared library 160, 162 from local address space. In 490, upon a determination that the target shared library 156 was loaded as a shared library container, the container handler 120 of the DL interceptor interacts with container platform 150 via the stack processor 132 to unload the target shared library 156. After the target shared library 156 has been unloaded, the process 400 proceeds to 495, in which session lifecycle management is performed by the session lifecycle management unit 118.

Figure 5:
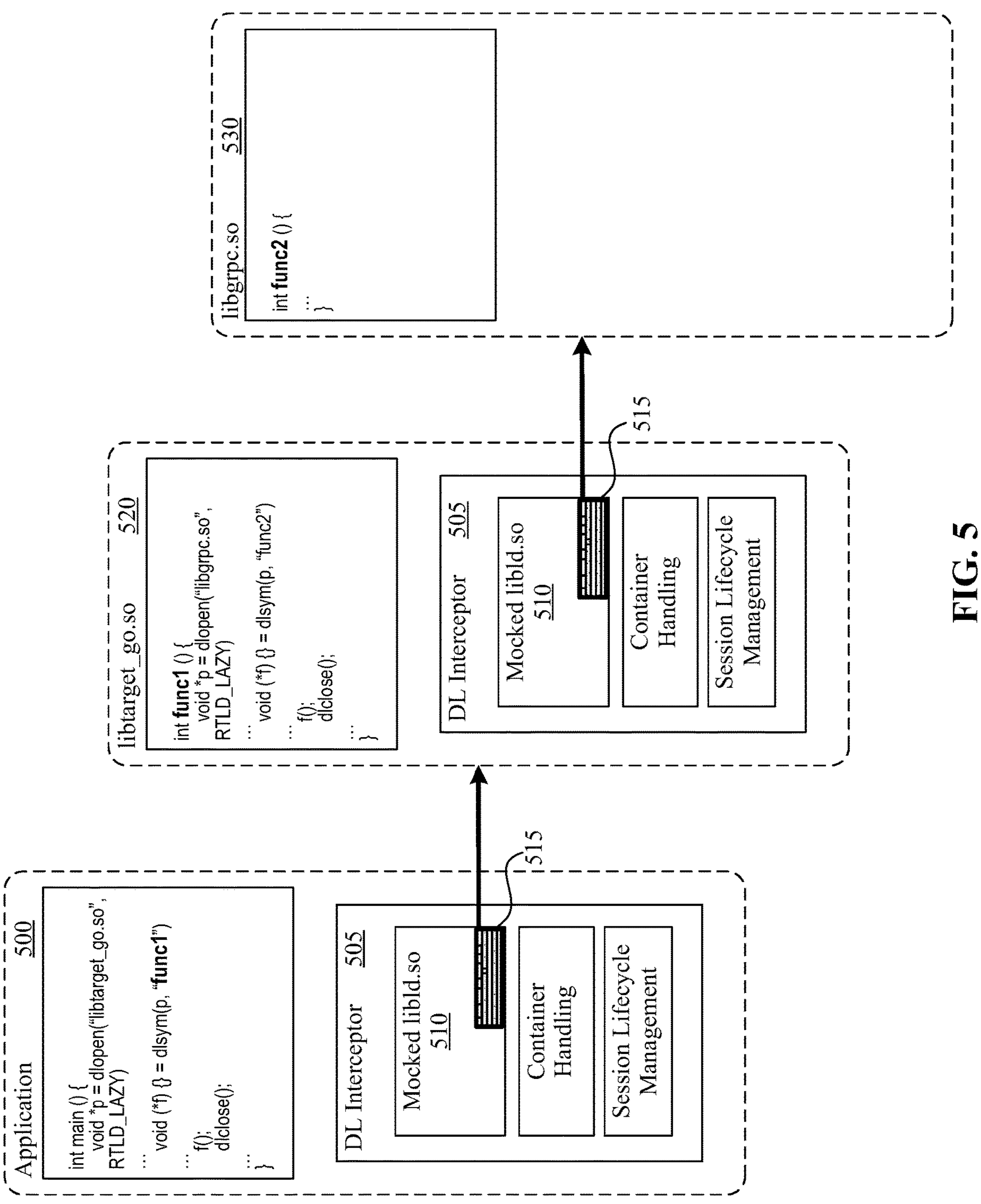
FIG. 5. illustrates a multiple layer call diagram according to an embodiment of the present invention.

In FIG. 5, the system 100 can be used to support the invoking of multiple dependent (or chained) shared libraries. Specifically, when an application (e.g., computer code) 500 attempts to open (e.g., using a dlopen ( ) function) a shared library (e.g., libtarget_go.so 520), the dlopen ( ) call can be intercepted by a DL interceptor module 505. The mocked dynamic linker 510 of the DL interceptor module 505 can interact with a shared library correlation table 140 to cause the opening of the shared library 520 using the methodology 300 described above.

This shared library 520, however, can also depend upon another shared library (e.g., libgrpc.so 530). As such, when the shared 520 library 520 attempts to load (e.g., using a dlopen ( ) function) the dependent shared library 530, this additional dlopen ( ) call can be intercepted by the DL interceptor module 505. The mocked dynamic linker 510 of the DL interceptor module 505 can then interact with a shared library correlation table 140 to cause the loading of the shared library 520 using the methodology 300 described above. These shared libraries 520, 530 can also be unloaded using the methodology 400 described above.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 6:
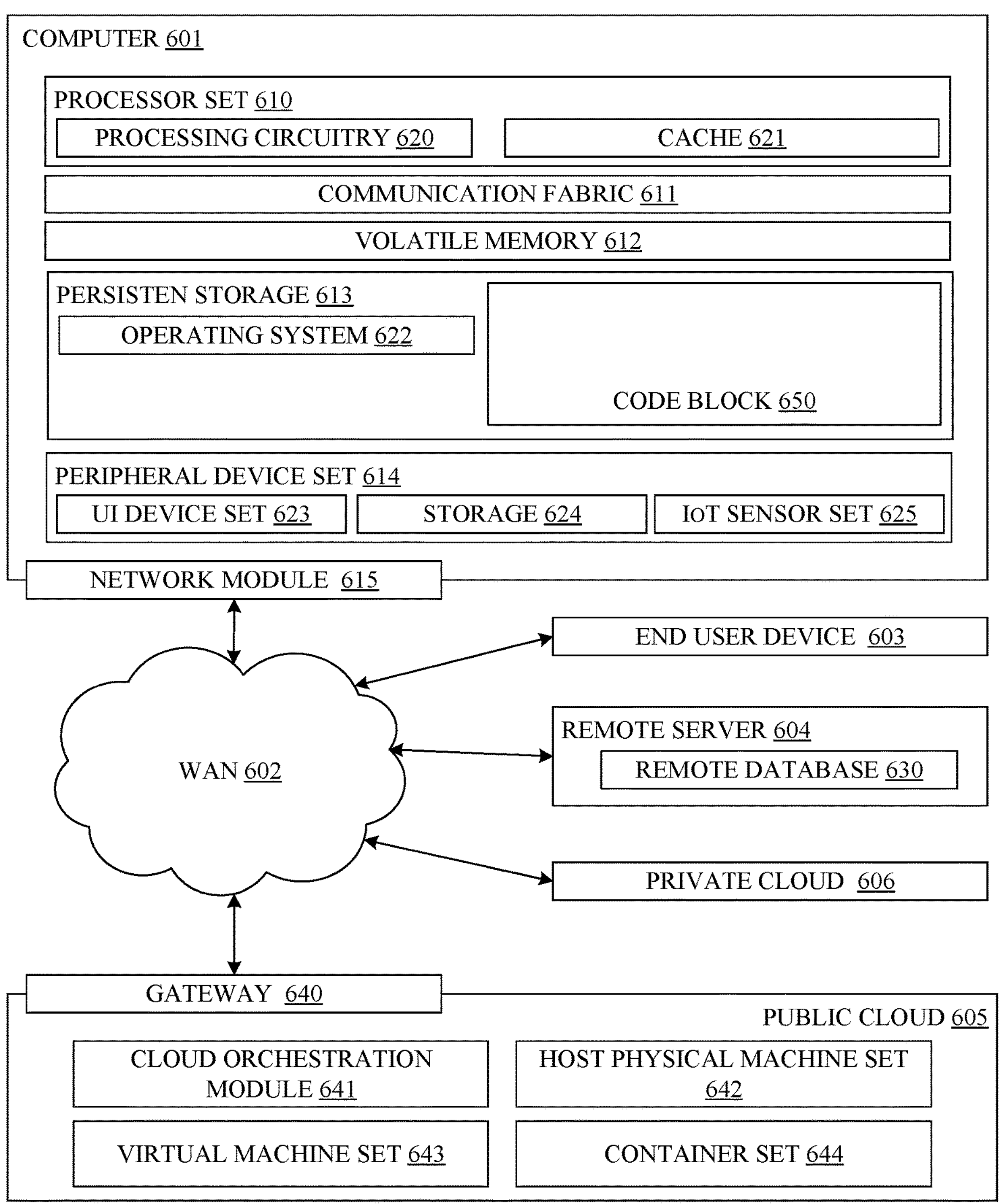
FIG. 6 is a block diagram illustrating an example of computer environment for implementing the methodology of FIGS. 3 and 4.

Referring to FIG. 6, computing environment 600 contains an example of an environment for the execution of at least some of the computer code involved in performing the inventive methods, such as code block 650 for implementing the operations of computer system 110 including the DL interceptor 114. Computing environment 600 includes, for example, computer 601, wide area network (WAN) 602, end user device (EUD) 603, remote server 604, public cloud 605, and private cloud 606. In certain aspects, computer 601 includes processor set 610 (including processing circuitry 620 and cache 621), communication fabric 611, volatile memory 612, persistent storage 613 (including operating system 622 and method code block 650), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. However, to simplify this presentation of computing environment 600, detailed discussion is focused on a single computer, specifically computer 601. Computer 601 may or may not be located in a cloud, even though it is not shown in a cloud in FIG. 6 except to any extent as may be affirmatively indicated.

Processor set 610 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In certain computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in code block 650 in persistent storage 613.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 611 is the signal conduction paths that allow the various components of computer 601 to communicate with each other. Typically, this communication fabric 611 is made of switches and electrically conductive paths, such as the switches and electrically conductive paths that make up busses, bridges, physical input/output ports and the like. Other types of signal communication paths may be used for the communication fabric 611, such as fiber optic communication paths and/or wireless communication paths.

Volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In computer 601, the volatile memory 612 is located in a single package and is internal to computer 601. In addition to alternatively, the volatile memory 612 may be distributed over multiple packages and/or located externally with respect to computer 601.

Persistent storage 613 is any form of non-volatile storage for computers that is now known or to be developed in the future. The non-volatility of the persistent storage 613 means that the stored data is maintained regardless of whether power is being supplied to computer 601 and/or directly to persistent storage 613. Persistent storage 613 may be a read only memory (ROM), but typically at least a portion of the persistent storage 613 allows writing of data, deletion of data and re-writing of data. Some familiar forms of persistent storage 613 include magnetic disks and solid state storage devices. Operating system 622 may take several forms, such as various known proprietary operating systems or open source Portable Operating System Interface type operating systems that employ a kernel. The code included in code block 650 typically includes at least some of the computer code involved in performing the inventive methods.

Peripheral device set 614 includes the set of peripheral devices for computer 601. Data communication connections between the peripheral devices and the other components of computer 601 may be implemented in various ways, such as BLUETOOTH™ connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some aspects, storage 624 may take the form of a quantum computing storage device for storing data in the form of qubits. In aspects where computer 601 is required to have a large amount of storage (for example, where computer 601 locally stores and manages a large database) then this storage 624 may be provided by peripheral storage devices designed for storing very large amounts of data, such as a storage area network (SAN) that is shared by multiple, geographically distributed computers. Internet-of-Things (IoT) sensor set 625 is made up of sensors that can be used in IoT applications. For example, one sensor may be a thermometer and another sensor may be a motion detector.

Network module 615 is the collection of computer software, hardware, and firmware that allows computer 601 to communicate with other computers through a Wide Area Network (WAN) 602. Network module 615 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 615 are performed on the same physical hardware device. In other aspects (for example, aspects that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any Wide Area Network (for example, the internet) capable of communicating computer data over non-local distances by any technology for communicating computer data, now known or to be developed in the future. In some aspects, the WAN 602 may be replaced and/or supplemented by local area networks (LANs) designed to communicate data between devices located in a local area, such as a Wi-Fi network. The WAN 602 and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In certain aspects, EUD 603 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. As defined herein, the term "server" means a data processing system configured to share services with one or more other data processing systems.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other aspects, a private cloud 606 may be disconnected from the internet entirely (e.g., WAN 602) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 605 and private cloud 606 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method, comprising:

loading an application into a local address space;

intercepting, by an interceptor, a request by the application to load a target shared library, wherein the request is generated using a dlopen call;

searching, using the interceptor and based upon the request being intercepted, a shared library correlation table for a loading count and a loading policy associated with the target shared library;

selecting, based upon the loading count and the loading policy, between:

loading the target shared library as a shared library container, and loading the target shared library into the local address space; and loading the target shared library based upon the selecting, wherein the loading count represents a number of times the target shared library was loaded, the loading policy indicates how the target shared library is to be loaded, the loading of the target shared library is performed using a mocked dlopen function, and the mocked dlopen function includes the searching the shared library correlation table.

2. The computer-implemented method of claim 1, wherein the shared library correlation table includes, for each target shared library of a plurality of target shared libraries:

the loading count, the loading policy, and one of a local handle or a container ID, the local handle is associated with a pointer to the target shared library loaded in the local address space, and the container ID is an identification of the shared library container of the target shared library.

3. The computer-implemented method of claim 2, wherein upon the interceptor intercepting a request to unload the target shared library, one of the local handle or the container ID for the target shared library is retrieved by the interceptor from the shared library correlation table.

4. The computer-implemented method of claim 3, wherein the interceptor is configured, based on the local handle being retrieved, to forward the local handle to a dynamic linker to unload the target shared library from the local address space.

5. The computer-implemented method of claim 3, wherein the interceptor is configured, based upon the container ID being retrieved, to forward the container ID to a container handler to unload the target shared library.

6. The computer-implemented method of claim 1, wherein based upon the loading count being an initial value:

a dynamic linker is invoked to load the target shared library, the loading count is incremented to generate an incremented loading count, and the incremented loading count is stored within the shared library correlation table.

7. The computer-implemented method of claim 1, further comprising invoking, based upon the loading count being greater than an initial value and the loading policy indicates to load the target shared library as a container, a container platform to load the shared library container.

8. A computer hardware system, comprising:

a hardware processor configured to perform the following executable operations:

loading an application into a local address space;

intercepting, by an interceptor, a request by the application to load a target shared library, wherein the request is generated using a dlopen call;

searching, using the interceptor and based upon the request being intercepted, shared library correlation table for a loading count and a loading policy associated with the target shared library;

selecting, based upon the loading count and the loading policy, between:

loading the target shared library as a shared library container, and loading the target shared library into the local address space; and loading the target shared library based upon the selecting, wherein the loading count represents a number of times the target shared library was loaded, the loading policy indicates how the target shared library is to be loaded, the loading of the target shared library is performed using a mocked dlopen function, and the mocked dlopen function includes the searching the shared library correlation table.

9. The computer hardware system of claim 8, wherein the shared library correlation table includes, for each target shared library of a plurality of target shared libraries:

the loading count, the loading policy, and one of a local handle or a container ID, the local handle is associated with a pointer to the target shared library loaded in the local address space, and the container ID is an identification of the shared library container of the target shared library.

10. The computer hardware system of claim 9, wherein upon the interceptor intercepting a request to unload the target shared library, one of the local handle or the container ID for the target shared library is retrieved by the interceptor from the shared library correlation table.

11. The computer hardware system of claim 10, wherein the interceptor is configured, based on the local handle being retrieved, to forward the local handle to a dynamic linker to unload the target shared library from the local address space.

12. The computer hardware system of claim 10, wherein the interceptor is configured, based upon the container ID being retrieved, to forward the container ID to a container handler to unload the target shared library.

13. The computer hardware system of claim 8, wherein based upon the loading count being an initial value:

a dynamic linker is invoked to load the target shared library, the loading count is incremented to generate an incremented loading count, and the incremented loading count is stored within the shared library correlation table.

14. The computer hardware system of claim 8, wherein the hardware processor is further configured to perform the operations comprising:

invoking, based upon the loading count being greater than an initial value and the loading policy that indicates to load the target shared library as a container, a container platform to load the shared library container.

15. A computer program product, comprising:

a computer readable storage medium having stored therein program code for training a training dataset, the program code, which when executed by a computer hardware system, cause the computer hardware system to perform:

loading an application into a local address space;

intercepting, by an interceptor, a request by the application to load a target shared library, wherein the request is generated using a dlopen call;

searching, using the interceptor and based upon the request being intercepted, a shared library correlation table for a loading count and a loading policy associated with the target shared library;

selecting, based upon the loading count and the loading policy, between:

loading the target shared library as a shared library container, and loading the target shared library into the local address space; and loading the target shared library based upon the selecting, wherein the loading count represents a number of times the target shared library was loaded, the loading policy indicates how the target shared library is to be loaded, the loading of the target shared library is performed using a mocked dlopen function, and the mocked dlopen function includes the searching of the shared library correlation table.

16. The computer program product of claim 15, wherein the shared library correlation table includes, for each target shared library of a plurality of target shared libraries:

the loading count, the loading policy, and one of a local handle or a container ID, the local handle is associated with a pointer to the target shared library loaded in the local address space, and the container ID is an identification of the shared library container of the target shared library.

17. The computer program product of claim 16, wherein upon the interceptor intercepting a request to unload the target shared library, one of the local handle or the container ID for the target shared library is retrieved by the interceptor from the shared library correlation table.

18. The computer program product of claim 15, wherein based upon the loading count being an initial value, a dynamic linker is invoked to load the target shared library, the loading count is incremented to generate an incremented loading count, and the incremented loading count is stored within the shared library correlation table.

* * * * *